United States Patent Office 3,504,521
Patented Apr. 7, 1970

3,504,521
METHOD AND DEVICE FOR THE CONTINUOUS ANALYSIS OF THE COMPOSITION OF A GAS
John Luckers, Liege, Belgium, assignor to Centre National de Recherches Metallurgiques, Brussels, Belgium, a corporation of Belgium
Filed Oct. 23, 1967, Ser. No. 677,481
Claims priority, application Belgium, Oct. 25, 1966, 41,119, Patent 688,861
Int. Cl. G01n 31/00
U.S. Cl. 73—1                     6 Claims

ABSTRACT OF THE DISCLOSURE

A gas analyser generates signals and passes them to a calibration unit and thence to a recorder. The calibration unit establishes at least two points on a variable characteristic by analysing separate standard gas samples. The analysis of one standard gas will correct the zero of the characteristic of the calibration unit and the gain characteristic of the calibration unit is corrected while analysing the other standard gas sample. The values of the corresponding points to the established points of the standard gases are then brought into correspondence and analysis of the standard gases is repeated at intervals.

---

The present invention relates to a method and a device for the continuous analysis of the composition of a gas, in particular of a blast furnace gas.

It is well known to analyse gaseous products of chemical or physico-chemical reactions for the purpose of obtaining information on the exact nature, the rate and the state of progress of the said reactions.

Equipment is available for analysing gases, in particular the throat gases of a furnace, which function satisfactorily. For this functioning to be considered as satisfactory, it is however necessary for a certain number of conditions to be fulfilled, among which can be mentioned primarily:

(1) Strict selection of measuring instruments, as well as of components associated with these instruments;

(2) Careful choice of the surroundings (temperature, vibrations, humidity) in which the said instruments are set up;

(3) The necessity for ensuring that the supply of sample gas to the analyser is of constant humidity and pressure that is stabilised at a fixed absolute pressure.

However, it has been found that even when all these conditions are fulfilled it is necessary to cary out periodical calibration of the outlet signals of the analysers, by using standard samples of gases. For this reason gas analysis equipment comprises not only an analyser, but also a calibration unit, which adjusts the analyser periodically, and a registration member on which the indications supplied by the analyser are recorded.

In Luxembourg Patent 50,379, there has already been proposed a continuous method for the analysis of gas in which the analysers are adjusted periodically, the adjustment or calibration being carried out preferably automatically.

This automation can be realised effectively by means of an electronic ordinator, but if such equipment is not available, an independent calibration unit can be used.

Such calibration units are well known but they often have disadvantages arising either from the principle used, or the quality of production. Among these disadvantages the following can be mentioned by way of example:

(1) Cross influencing between the zero and gain corrections, i.e. between the regulating of the slope of the characteristic (gain) and the regulating of its co-ordinates at origin (zero).

(2) Insufficient precision in the apparatus used;

(3) Very high cost of this equipment in relation to the performance obtained.

The aim of the present invention is accordingly to overcome these disadvantages and to supply a method for adjustment which allows independent zero and gain corrections, as well as increased precision.

The method for the automatic adjustment of gas analysers which forms the subject of the invention has the essential feature that the characteristic curve of the calibration unit is modified as a function of the drift of the analysis apparatus, in such a way as to maintain invariable indications on the recording apparatus, and that this modification is obtained by means of zero and gain corrections which are absolutely independent of each other.

The invention also aims at providing a device, called hereinafter "calibration unit," by which it is possible to put in operation the method of the invention.

For the better understanding of the method of the invention, reference will now be had to its application to the automatic adjustment or calibration of a blast furnace gas analyser which is described with reference to the accompanying drawings. This description is given solely by way of example, and in no restrictive sense.

The calibration of a gas analyser, for instance an infrared gas analyser, includes the control of at least two points on its scale. These two points are preferably located at or near the limits of the normal range of variation of the gaseous analysed component.

Figure 1:
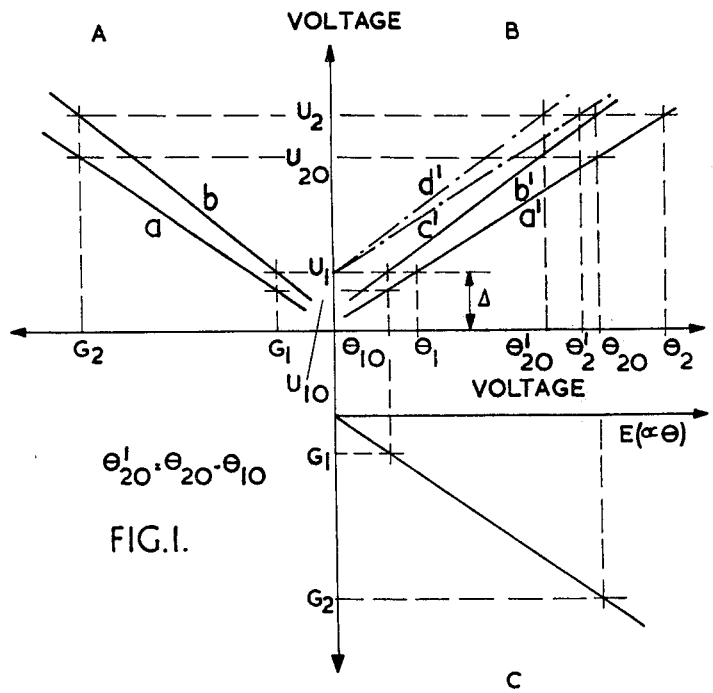
FIGURE 1 shows the principle of the modification of the characteristic of the calibration unit during the correction of the drift of the analysers.

Graph $a$, FIGURE 1A, gives the initial characteristic of the analyser, which is taken as a reference characteristic, obtained from indications $U_{10}$ and $U_{20}$ supplied by the analyser for the standard sample gases $G_1$ and $G_2$. These signals $U_{10}$ and $U_{20}$, applied to the input of the calibration unit (FIGURE 1B) give output signals $\theta_{10}$ and $\theta_{20}$, which makes it possible to plot the graph $a'$ (FIGURE 1B). In the same way, these signals $\theta_{10}$ and $\theta_{20}$ introduced into the recorder, by virtue of the characteristic of this apparatus give indications $G_1$ and $G_2$ which should repeat when the analyser functions with one of the sample gases $G_1$ or $G_2$ respectively (FIGURE 1C).

It should be noted that these calibration graphs can be considered as straight lines, by reason on the one hand of the limitation of the measurement range used and on the other hand of the impossibility of actually checking the real curvature with sufficient precision, since the deviations of the real graph line in relation to a straight line are at a maximum of 0.1 volume percent.

After a certain period of operation, the analyser A will have drift and the gases $G_1$ and $G_2$ give respectively the indications $U_1$ and $U_2$ (FIGURE 1A, graph $b$). Under these conditions the characteristic $a'$ of the calibration unit gives output signals $\theta_1$ and $\theta_2$, which no longer supply the correct indications $G_1$ and $G_2$ to the recording member.

In order to re-establish these indications $G_1$ and $G_2$ it is accordingly necessary to modify the characteristic of the calibration unit. This modification is possible, in accordance with the invention, by means of a single control for each of the two gases analysed $G_1$ and $G_2$, the procedure being as follows:

(a) During the passage of the gas $G_1$ in the analyser

A, one subtracts a voltage $\Delta$ from $U_1$ at the input of the calibration unit, in such a way as to cancel out the output signal $\theta_1$. In FIGURE 1B, this corresponds to the translation of the characteristic of $a'$ into $c'$.

(b) The analyser is changed over and the gas $G_2$ caused to pass; during the passage of the latter, there is picked up at the output of an amplifier $A_1$ a voltage $\theta'_2$ which is defined as $(\theta_{20}-\theta_{10})$, i.e. the difference between the input signals to the calibration unit arising from the standard gas $G_1$ and $G_2$. These two voltages $\theta'_2$ and $\theta'_{20}$ should be rendered equal. To arrive at this, their difference $(\theta'_2-\theta'_{20})$ is reduced to zero, which, as can be seen from FIGURE 1B, reveals itself by the change rotation of the characteristic graph from $c'$ to $d'$.

(c) As the output voltage of the calibration unit should be $\theta_{10}$ and not zero for the gas $G_1$, it suffices to add a voltage $\theta_{10}$ to the output signals of the calibration unit.

For the gases $G_1$ and $G_2$, the output voltages accordingly become respectively $\theta_{10}$ and $$\theta'_{20}+\theta_{10}=\theta_{20}-\theta_{10}+\theta_{10}=\theta_{20}$$

whereas the input voltages are $U_1$ and $U_2$. The new characteristic is accordingly determined and in FIGURE 1B, the graph $d'$ executes a translation of $\theta_{10}$ to arrive at $b'$, which is the graph desired. A further passage of the gas $G_1$ in the analyser will give at the output of the calibration unit a voltage $\theta_{10}$, which clearly shows that the regulation of the gain of the calibratiion unit has not affected the regulation of zero carried out previously.

Figure 2:
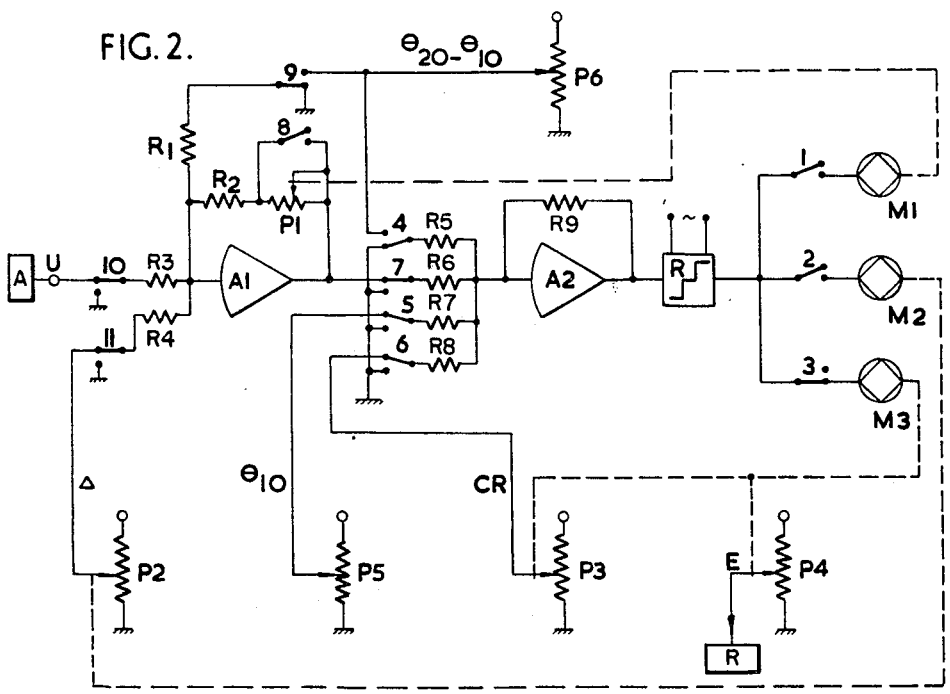
FIGURE 2 shows the functioning diagram of an automatic calibration unit.

All the operations mentioned above are carried out by the automatic calibration unit, of which FIGURE 2 shows a circuit diagram.

This assembly has two operational amplifiers A1 and A2 which carry out the various operations additions of voltages, of modifications of gain and of comparison to reference voltages.

Three miniature synchronous motors (M1, M2, M3) control respectively potentiometers P1, P2, P3 for regulating the gain for regulating zero and for normal indication of operation in a blast furnace, respectively, a potentiometer P4 coupled to the shaft of the motor M3 at the same time as P3 gives the signal supplied to the recording member. The control of the motors is under the control of a device R sensitive to the amplifier A2 and consists in a reversal of their direction of operation. This is possible by virtue of the fact that each method of functioning consists in bringing the output voltage of A2 to zero, i.e. to an equilibrium which can take place solely on an indication of imbalance.

The resistors R3 through R9 modify the signals applied in dependence on the operating characteristics of the amplifiers A1 and A2.

Manually controlled potentiometers P5 and P6 supply variable signals. They are set to positions corresponding to output voltages equal to $\theta_{10}$ and $(\theta_{20}-\theta_{10})$ respectively.

The gain K of the amplifier A1 is controlled by the resistors R1, R2 and the potentiometer P1, which is controlled by the motor M1.

The circuit further comprises eleven relays numbered 1 to 11, each of which has one earthed or open position and one closed or operative position.

Relays 1 to 6 are actuated by the control unit for the calibrations. Relays 7 to 11 are actuated by manual control. They provide the following functions:

(a) Functioning on blast furnace gas

The relays 1, 2, 4, 8, 9, are open.
The relays 3, 5, 6, 7, 10, 11 are closed.
The amplifier A2 accordingly receives the voltages $\theta'=K(U-\Delta)$, $\theta_{10}$ and C.R., where K is a constant of proportionality representing the gain of A1. The output voltage of A2 is cancelled permanently by the action of the motor M3 on the counter voltage C.R.: in other words, the voltage C.R. is kept constantly equal to $$(\theta'+\theta_{10})=\theta$$

On the other hand, the voltage E supplied to the recording member R is supplied advantageously from a separate potentiometer P4, coupled to the shaft of the motor M3 in such a way as to avoid any influence of the recording member on the gas analyser. As the angular position of the shaft of this motor varies as a direct function of $\theta$, the voltage E is also proportional to $\theta$, which corresponds to the characteristic indicated in FIGURE 1C.

(b) Functioning on sample gas $G_1$: correction of zero to compensate for drift

The relays 1, 3, 4, 5, 6, 8, 9, are open.
The relays 2, 7, 10, 11, are closed
The amplifier A1 receives U and $\Delta$, and the motor M2 acts on P2 and hence $\Delta$ in such a way as to make the output voltage of A1, equal to $\theta_1$.
This corresponds, in FIGURE 1B, to the translation of the characteristic from $a'$ at $c'$.

(c) Functioning on sample gas $G_2$: correction of gain to compensate for drift

The relays 2, 3, 5, 6, 8, 9, are open.
The relays 1, 4, 7, 10, 11, are closed.
The amplifier A2 receives $K(U_2-\Delta)$ and $(\theta_{20}-\theta_{10})$; its output voltage is rendered zero by varying the gain K of A1, i.e. by making $K(U_2-\Delta)=\theta_{20}-\theta_{10}$. The gain K is dependent on the setting of the potentiometer formed by resistor R2 and potentiometer P1 and this is variable by means of the motor M1.
This annulment of the output voltage of A2 corresponds to the rotation of the characteristic from $c'$ at $d'$ (FIGURE 1B).

(d) Further functioning on blast furnace gas

The relays 1, 2, 4, 8, 9, are open
The relays 3, 5, 6, 7, 10, 11, are closed.
With the relay 5 again closed, one adds a voltage $\theta_{10}$ to the output signal of A1, which (FIGURE 1B) means the translational displacement of the characteristic from $d'$ to $b'$.
The use of a recording member supplied by an independent voltage source presents a considerable supplementary advantage. In actual fact, during the adjustment of the calibration unit by means of standard sample gases, the recording member during the whole period of the adjustment maintains the indications obtained during the functioning of the analyser with blast furnace gas, which makes it possible for the operator to exploit these indications to the maximum, in particular for integration by the planimetering of plotted graphs. These indications are modified only during the subsequent functioning of the analyser with blast furnace gas.

(e) Regulation of references

For undertaking the regulation of the reference voltages $\theta_{10}$ and $\theta_{20}$, i.e. of signals corresponding to the "low" and "top of the scale" gases, it has been found advantageous to work in the following way:
Regulation of $\theta_{10}$: one opens the relays 1, 2, 4, 7 and one closes the relays 3, 5 and 6. By reason of the opening of the relay 7, the positions of the relays 8 to 11 have no importance, since the connection from A1 to A2 is interrupted. By putting M3 in operation with $\theta_{10}$ at the input of A2, the recorder indicates a value proportional to $\theta_{10}$. As this voltage $\theta_{10}$ is supplied from a potentiometer (P5) with manual control, it is easy to bring about the coincidence of the indication on the recorder with the already known line corresponding to the analysis of the standard or sample gas $G_1$. This already known line may be marked on the recorder scale for ease of reference.

Regulation of $\theta_{20}$: one opens the relays 1, 2, 4, 10, 11 and one closes the relays 3, 5, 6, 7, 8 and 9.

The values of the resistors $R_1$ and $R_2$ are such that the gain of the amplifier A1 is 1, for this method of functioning. Accordingly, at the output of the amplifier A1, one has a voltage $(\theta_{20}-\theta_{10})$ with changed sign, i.e. $(\theta_{20}-\theta_{10})$. The input voltage of the amplifier A2 is $$(\theta_{20}-\theta_{10})-\theta_{10}=-\theta_{20}$$

and the motor M3 begins to operate, carrying the potentiometer P4. The recorder accordingly indicates a value proportional to $\theta_{20}$. By modifying manually the position of the potentiometer P6, it is easy to bring about the coincidence known position of the indication on the recorder with the line corresponding to the analysis of the standard gas $G_2$.

I claim:

1. In a method for the adjustment of gas analysis apparatus comprising a gas analyser, a calibration unit and a recorder, in which the gas analyser generates signals and passes them to the calibration unit, the calibration unit having a variable characteristic: the improvement of establishing at least two points on the characteristic by analysing separate standard gas samples, repeating the analysis at intervals and independently correcting the zero of the characteristic of the calibration unit while analysing one of the standard gas samples and the gain characteristic of the calibration unit while analysing the other standard gas sample so as to bring the values corresponding to the standard gases into correspondence with the established points.

2. A method as claimed in claim 1, in which the recorder is supplied by means of a separate voltage source so as to avoid interactions between recorder and analyser.

3. In apparatus for gas analysis comprising a gas analyser, a calibration unit adapted to receive signals from the analyser, and to pass modified signals to a recorder, the calibration unit comprising means for modifying the characteristic thereof: the improvement that the modifying means includes means for modifying the gain of the calibration unit and means for modifying the zero of the calibration unit to compensate for drift in the gas analyser, means responsive to signals received from the analysis of a first standard gas to set the said means for modifying the zero of the calibration unit and means responsive to signals received from the analysis of a second standard gas to set the gain of the calibration unit, whereby the output signals of the calibration unit are restored to standard values for the tested gas.

4. Apparatus as claimed in claim 3, comprising means for disconnecting the means for setting the zero and gain characteristics of the calibration unit whereby the calibration unit may be used with the gain and zero correcting means stabilized at the selected settings.

5. Apparatus as claimed in claim 3, comprising an independent source of power to the recording unit.

6. Apparatus as claimed in claim 3, in which modifying means for gain and zero function automatically.

References Cited

UNITED STATES PATENTS

| | | | |
|---|---|---|---|
| 2,400,828 | 5/1946 | Keinath | 346—32 |
| 2,790,945 | 4/1957 | Chope | 330—9 XR |
| 2,919,409 | 12/1959 | Williams | 330—10 XR |
| 3,292,421 | 12/1966 | Meyer | 73—27 |
| 3,310,974 | 3/1967 | Banks | 73—1 |

LOUIS R. PRINCE, Primary Examiner

H. C. POST III, Assistant Examiner

U.S. Cl. X.R.

73—23; 330—9